United States Patent
Smith et al.

(10) Patent No.: US 8,082,428 B2
(45) Date of Patent: *Dec. 20, 2011

(54) METHODS AND SYSTEM FOR RESOLVING SIMULTANEOUS PREDICTED BRANCH INSTRUCTIONS

(75) Inventors: Rodney Wayne Smith, Raleigh, NC (US); Brian Michael Stempel, Raleigh, NC (US); James Norris Dieffenderfer, Apex, NC (US); Thomas Andrew Sartorius, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/569,365

(22) Filed: Sep. 29, 2009

(65) Prior Publication Data
US 2010/0023696 A1     Jan. 28, 2010

Related U.S. Application Data (63) Continuation of application No. 11/535,536, filed on Sep. 27, 2006, now Pat. No. 7,617,387.

(51) Int. Cl.
*G06F 9/30* (2006.01)
*G06F 9/40* (2006.01)
*G06F 7/38* (2006.01)
*G06F 9/00* (2006.01)
*G06F 9/44* (2006.01)

(52) U.S. Cl. ......... 712/239; 712/216; 712/234; 712/240

(58) Field of Classification Search ............ 712/239, 712/240
See application file for complete search history.

(56) References Cited

U.S. PATENT DOCUMENTS

| | | | |
|---|---|---|---|
| 5,740,417 | A | 4/1998 | Kennedy et al. |
| 5,752,014 | A | 5/1998 | Mallick et al. |
| 5,758,143 | A | 5/1998 | Levitan |
| 6,119,075 | A | 9/2000 | Dean et al. |
| 6,157,998 | A | 12/2000 | Rupley, II et al. |
| 6,260,138 | B1 | 7/2001 | Harris |
| 6,460,132 | B1 | 10/2002 | Miller |
| 6,477,640 | B1 | 11/2002 | Rupley, II et al. |
| 6,578,134 | B1 | 6/2003 | Van Dyke et al. |
| 6,757,816 | B1 | 6/2004 | Yoaz et al. |
| 2002/0038417 | A1 | 3/2002 | Strombergsson et al. |
| 2004/0158697 | A1 | 8/2004 | Col |
| 2005/0125646 | A1 | 6/2005 | Yokoi |
| 2008/0077781 | A1 | 3/2008 | Smith et al. |

OTHER PUBLICATIONS

International Search Report—PCT/US2007/079781, International Search Authority—European Patent Office Jan. 25, 2008.
Written Opinion—PCT/ US2007/079781, International Search Authority—European Patent Office Jan. 25, 2008.

*Primary Examiner* — Eddie P Chan
*Assistant Examiner* — William Partridge
(74) *Attorney, Agent, or Firm* — Peter M. Kamarchik; Nicholas J. Pauley; Jonathan T. Velasco (57) ABSTRACT

A method of resolving simultaneous branch predictions prior to validation of the predicted branch instruction is disclosed. The method includes processing two or more predicted branch instructions, with each predicted branch instruction having a predicted state and a corrected state. The method further includes selecting one of the corrected states. Should one of the predicted branch instructions be mispredicted, the selected corrected state is used to direct future instruction fetches.

14 Claims, 4 Drawing Sheets

METHODS AND SYSTEM FOR RESOLVING SIMULTANEOUS PREDICTED BRANCH INSTRUCTIONS

CLAIM OF BENEFIT UNDER 35 U.S.C. 120

This application is a continuation of prior application Ser. No. 11/535,536 entitled "METHODS AND SYSTEM FOR RESOLVING SIMULTANEOUS PREDICTED BRANCH INSTRUCTIONS," filed 27 Sep. 2006, assigned to the assignee hereof and expressly incorporated by reference herein.

BACKGROUND

1. Field of Invention

The present invention relates generally to computer systems, and more particularly to techniques for resolving simultaneous predicted branch instructions.

2. Relevant Background

At the heart of the computer platform evolution is the processor. Early processors were limited by the technology available at that time. New advances in fabrication technology allow transistor designs to be reduced up to and exceeding $\frac{1}{1000}^{th}$ of the size of early processors. These smaller processor designs are faster, more efficient and use substantially less power while delivering processing power exceeding prior expectations.

As the physical design of the processor evolved, innovative ways of processing information and performing functions have also changed. For example, "pipelining" of instructions has been implemented in processor designs since the early 1960's. One example of pipelining is the concept of breaking execution pipelines into units, through which instructions flow sequentially in a steam. The units are arranged so that several units can be simultaneously processing the appropriate parts of several instructions. One advantage of pipelining is that the execution of the instructions is overlapped because the instructions are evaluated in parallel. Pipelining is also referred to as instruction level parallelism (ILP).

A processor pipeline is composed of many stages where each stage performs a function associated with executing an instruction. Each stage is referred to as a pipe stage or pipe segment. The stages are connected together to form the pipeline. Instructions enter at one end of the pipeline and exit at the other end.

Although pipeline processing continued to be implemented in processor designs, it was initially constrained to executing only one instruction per processor cycle. In order to increase the processing throughput of the processor, more recent processor designs incorporated multiple pipelines capable of processing multiple instructions simultaneously. This type of processor with multiple pipelines may be classified as a superscalar processor.

Within a processor, certain types of instructions such as conditional branch instructions may be predicted. Branch prediction hardware within the processor may be designed to provide predictions for conditional branch instructions. Based on the prediction, the processor will either continue executing the next sequential instruction or be directed to a subsequent instruction to be executed.

A superscalar processor utilizing branch prediction hardware may encounter and resolve two or more predicted branch instructions simultaneously within the same clock cycle in the same or separate pipelines. Commonly in such applications, the processor had to wait until it could determine the full resolution of both branch predictions in order to determine the oldest mispredicting branch before taking any remedial steps in case of a misprediction. There exists a need to decouple the selection of a corrected state from determining the oldest mispredicted branch for a high-speed processor encountering multiple branch predictions.

SUMMARY

The present disclosure recognizes this need and discloses a processor which processes simultaneous branch instruction predictions by anticipating the appropriate action and taking steps towards fulfilling the appropriate action before the full resolution of all the simultaneous branch instruction predictions are available.

A method of resolving simultaneous predicted branch instructions prior to validation of the predicted branch instructions is disclosed. The method first comprises processing two or more predicted branch instructions. Each predicted branch instruction has a predicted state and a corrected state. The predicted branch instructions simultaneously enter a resolution stage and one of the corrected states from one of the predicted branch instructions is selected. The method further verifies that at least one of the predicted branch instructions has mispredicted, and the selected corrected state is used to direct future instruction fetches.

A method of resolving simultaneous predicted branch instructions prior to validation of the predicted branch instructions in a plurality of pipelines first comprises processing two or more predicted branch instructions. Each predicted branch instruction has a predicted state and a corrected state. The predicted branch instructions enter a resolution stage in separate pipelines simultaneously and one of the corrected states is selected from one of the predicted branch instructions. The method further verifies that at least one of the predicted branch instructions has mispredicted and the selected corrected state is used to direct future instruction fetches.

A system for resolving simultaneous predicted branch instructions prior to the validation of the predicted branch instructions comprises prediction logic configured to predict multiple branch instructions. Each predicted branch instruction has a predicted state and a corrected state. The system also has resolution logic configured to determine when two or more of the predicted branch instructions reach a resolution stage simultaneously. The resolution logic then selects one of the corrected states from one of the predicted branch instructions. The system also has fetch logic configured to fetch future instructions based on the selected corrected state.

A more complete understanding of the present invention, as well as further features and advantages of the invention, will be apparent from the following detailed description and the accompanying drawings.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

In a superscalar processor, the processor's internal resources are designed to facilitate parallel processing. Several facets of the design include instruction pre-fetching, branch processing, resolution of data dependencies involving register values, initiation of instructions and the like. Because processors operate faster than most memory devices, the program instructions are unable to be read directly from memory fast enough to properly utilize the full potential of the processor.

An instruction cache is a specialized memory designed to bridge the speed gap between traditional memory and the processor. Instructions fetched from memory are placed in the faster instruction cache which is able to be read at processor clock speeds. Fetched instructions may be the next sequential instructions in the program or a target of a predicted taken branch. When the next instruction is the target of a predicted branch, the processor attempts to predict where the branch will go and fetch the appropriate instructions in advance. If the branch prediction is incorrect, the processor corrects its instruction processing by purging instructions fetched down the predicted branch path, and resumes fetching instructions down the corrected branch path. This process is described in greater detail in the discussion of FIGS. 2, 3 and 4.

Figure 1:
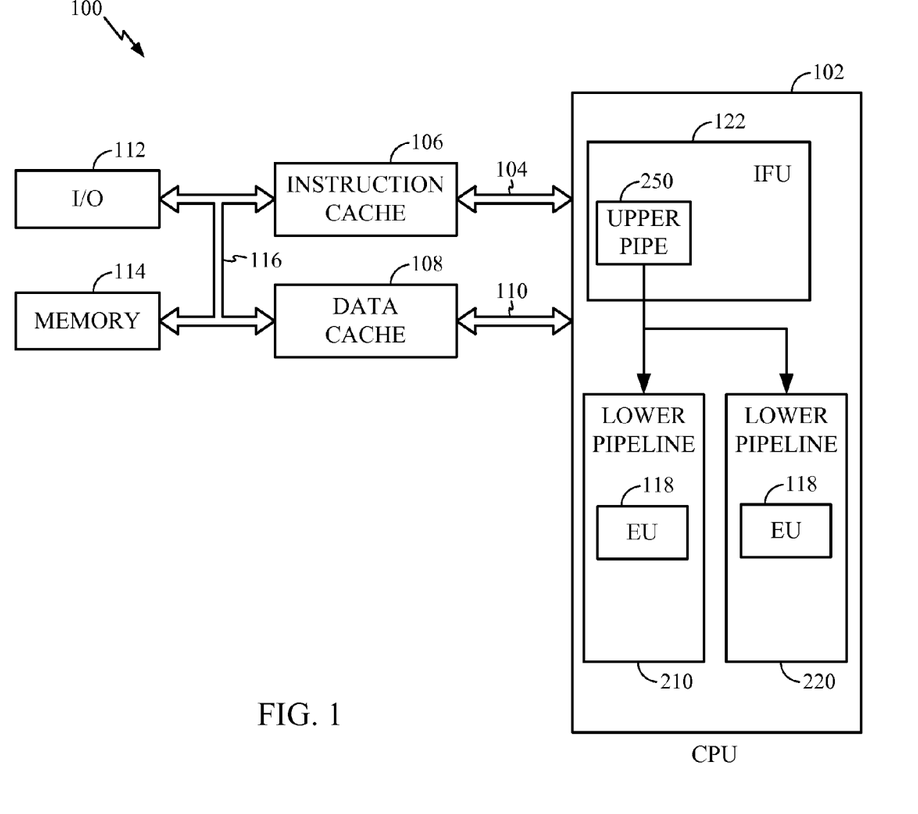
FIG. 1 shows a high level logic hardware block diagram of a processor using one embodiment of the present invention.

FIG. 1 shows a high level view of a superscalar processor 100 utilizing one embodiment as hereinafter described. The processor 100 has a central processing unit (CPU) 102 that is connected via a dedicated high speed bus 104 to an instruction cache 106. The CPU also has another separate high speed bus 110 that connects to a data cache 108. The instruction cache 106 and data cache 108 are also connected via a general purpose bus 116 to input/output ports (I/O) 112 and memory 114.

Within the processor 100, an Instruction Fetch Unit (IFU) 122 controls the loading of instructions from memory 114 into the instruction cache 106. Once the instruction cache 106 is loaded with instructions, the CPU 102 is able to access the instructions via the high speed bus 104. The instruction cache 106 may be a separate memory structure as shown in FIG. 1, or may be integrated as an internal component of the CPU 102. The integration may hinge on the size of the instruction cache 106 as well as the complexity and power dissipation of the CPU 102.

Instructions may be fetched and decoded from the instruction cache 106 several instructions at a time. Within the instruction cache 106 instructions are grouped into sections known as cache lines. Each cache line may contain multiple instructions. The number of instructions fetched may dependent upon the required fetch bandwidth as well as the number of instructions in each cache line. In one embodiment, the CPU 102 loads four instructions from the instruction cache 106 into an upper pipeline 250 in the IFU 122 during each clock cycle. Within the upper pipeline 250, the instructions are analyzed for operation type and data dependencies. After analyzing the instructions, the processor 100 may distribute the instructions from the upper pipe 250 to lower functional units or pipelines 210 and 220 for execution.

The instructions may be sent to lower pipelines 210 or 220 depending on the instruction function, pipe availability, instruction location within the group of instructions loaded from the instruction cache 106 and the like. Within the lower pipelines 210 and 220, the instructions are processed in parallel based on available resources rather than original program sequence. This type of processing is often referred to as dynamic instruction scheduling.

Lower pipelines 210 and 220 may contain various Execution Units (EU) 118 such as arithmetic logic units, floating point units, store units, load units and the like. For example, an EU 118 such as an arithmetic logic unit may execute a wide range of arithmetic functions, such as integer addition, subtraction, simple multiplication, bitwise logic operations (e.g. AND, NOT, OR, XOR), bit shifting and the like. After an instruction finishes executing, the CPU 102 takes the instruction results and reorders them into the proper sequence so the instruction results can be used to correctly update the processor 100.

Most programs executed by the processor 100 may include conditional branch instructions. The actual branching behavior of the conditional branch instruction is not known until the instruction is executed deep in the lower pipeline 210 or 220. To avoid a stall that might result from waiting for the final execution of the branch instruction and subsequently having to fetch instructions based on the results of the branch instruction, the processor 100 may employ some form of branch prediction. Using branch predictions the processor 100 may predict the branching behavior of conditional branch instructions in the upper pipe 250. Based on the predicted branch evaluation, the processor 100 speculatively fetches and prepares to execute instructions from a predicted address—either the branch target address (e.g. if the branch is predicted taken) or the next sequential address after the branch instruction (e.g. if the branch is predicted not taken).

One example of a conditional branch instruction is the simple assembler instruction jump not equal (JNE). When the JNE instruction is executed, a particular value may be loaded into a register and if the value were equal to zero, the conditional branch is not taken and the next instruction in sequence is fetched and executed. However if the value in the register is not equal to zero, the conditional branch is considered taken and the next instruction fetched is located at a target address associated with the JNE instruction. The target address could have been previously associated with the JNE instruction on a previous execution of the JNE instruction.

When predicting instructions several conditions or "states" may be predicted. For example, branch direction, target addresses or a particular state of the processor 100 such as processor mode may be predicted. Predicting the processor mode may entail predicting what mode the processor 100 will be in after the execution of the branch instruction. For example, in the advanced RISC processor architecture, instructions may be executed in either ARM mode or Thumb mode.

One possible way of predicting the direction of a conditional branch is to utilize a branch history table. A branch history table may be a simple look up table that stores the history of a number of the previous branches. One branch history table may store the 1024 directions of previous conditional branches. A complex algorithm may be written to make a branch prediction based a hierarchy of prediction techniques (multi-level branch predictors).

Figure 2:
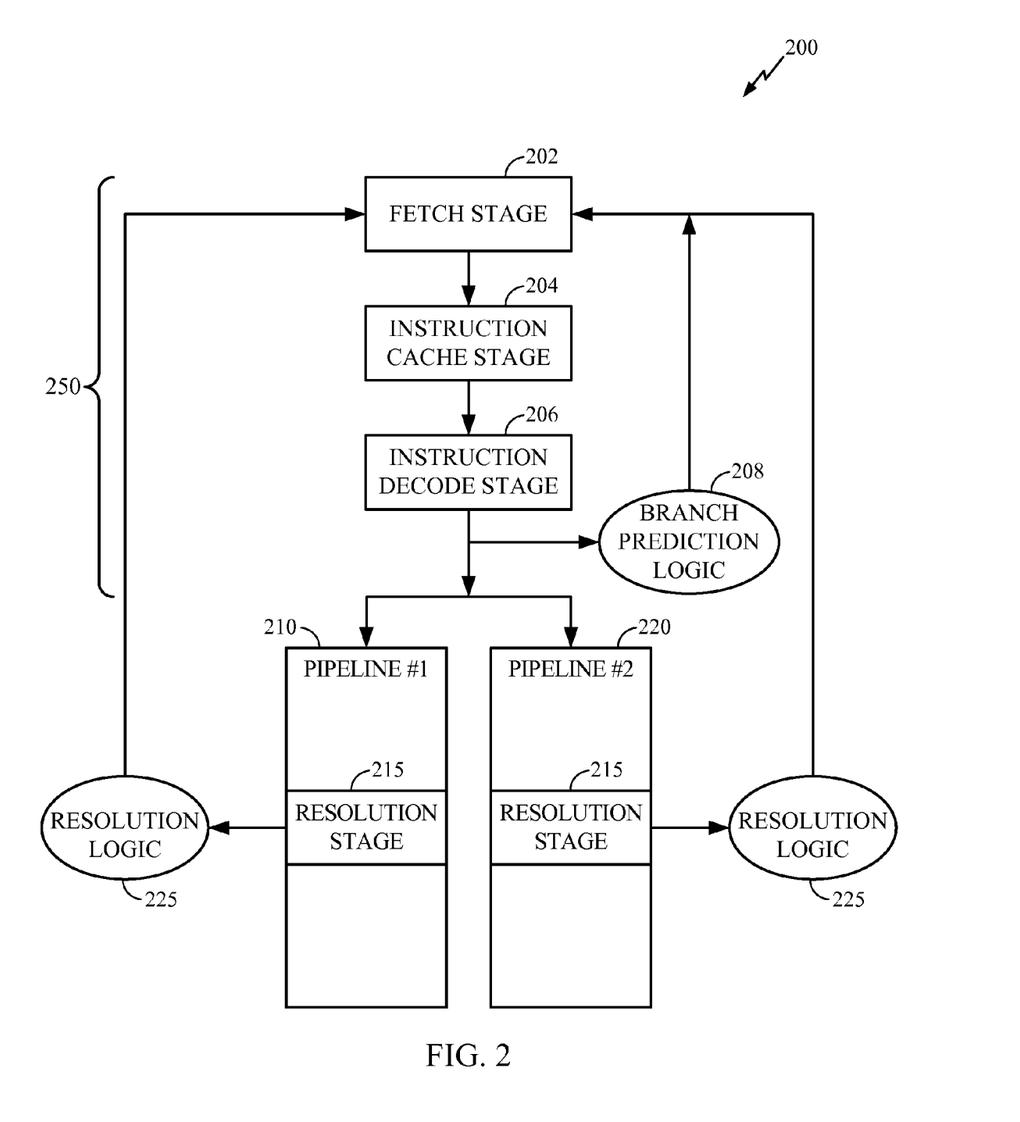
FIG. 2 shows a lower level logic block diagram of a superscalar processor utilizing one embodiment of the present invention.

FIG. 2 displays a lower level functional block diagram 200 of the upper pipe 250 and two lower pipelines 210 and 220 within the processor 100, processing instructions in accordance with one aspect of the present invention. The different logic blocks (or stages) within the functional hardware block diagram 200 may contain hardware, firmware or a combination of both. The functional hardware block diagram 200 consists of the upper pipe 250 and the two lower pipelines 210 and 220. As previously mentioned, the stages for upper pipe 250 may reside within the IFU 122. Within the upper pipe 250 is a fetch stage 202, an instruction cache stage 204, an instruction decode stage 206. Also associated with the upper pipe 250 is branch prediction logic 208.

The first stage in the upper pipe 250 is the fetch stage 202. The fetch stage 202 controls the selection of the next group of instructions to be retrieved. After the processor 100 powers up, the fetch stage 202 determines that initialization instructions are to be retrieved and loaded. As is described in connection with the discussions of FIG. 3 and FIG. 4, the fetch stage 202 also may receive feedback from the lower pipelines 210 and 220. The feedback may influence the selection of future instructions and in what order the instructions are to be executed.

In the instruction cache stage 204, the instruction address selected during the fetch stage 202 is used to access the instruction cache 106 to determine if the instructions at that address are present. If there is an instruction cache hit, the CPU 102 retrieves instructions from the instruction cache 106 into the upper pipe 250, allowing the processor 100 to fetch instructions at processor speed without going back to memory 114. If there is an instruction cache miss (i.e. instructions to be fetched are not available from the instruction cache 106), the IFU 122 retrieves the instructions from memory 114, loads them into the instruction cache 106, and transfers them to the CPU 102. After the instructions are retrieved during the instruction cache stage 204, the instructions are analyzed during the instruction decode stage 206.

During the instruction decode stage 206, information pertaining to the various instructions is analyzed and processed. For example, within the instruction decode stage 206, the processor 100 may determine the type of instruction (e.g. move, store, load, jump, and the like). If the instruction is a conditional branch instruction, branch prediction logic 208 will be invoked. The instruction decode stage 206 communicates with the branch prediction logic 208 informing the branch prediction logic 208 that it has encountered a branch instruction.

As part of the branch prediction, the branch prediction logic 208 provides a predicted state. Information stored in the predicted state, may include a predicted branch direction, a predicted target address, or a predicted state of the processor 100. This information may be stored in a register, group of registers, or memory location associated with the branch instruction. In one aspect of the present invention, the predicted state may contain only the predicted branch direction. In another embodiment, the predicted state may contain information relating only to the predicted branch direction and the predicted target address. In a further embodiment, the predicted state may contain information relating to the predicted target address and predicted processor mode. In yet another embodiment, the predicted state may contain information for the predicted branch direction, the predicted target address and the predicted processor mode.

When a branch direction is predicted the predicted state may contain information predicting the branch as taken or not taken. In one embodiment, the prediction state may be a single bit. For example, a "1" stored in a bit location within a register or memory location associated with the predicted state may indicate the branch as predicted taken. Conversely, if a "0" were stored at that bit location within the register or memory location, the branch may be predicted as not taken.

If a target address is predicted, the predicted state may contain a target address indicating the location where the next instruction is to be fetched. The size of the target address may be dependent on the architecture of the processor 100. In one embodiment, the target address may be a 32-bit address identifier stored in a register associated with the predicted state.

When a processor mode is predicted, the predicted state may contain information relating to the predicted mode the processor 100 will be in once the conditional branch is executed. For example, based on the prediction for processor mode, the processor may take steps such as performing the instruction decode differently (i.e. ARM decode of the instruction versus Thumb decode of the instruction). The predicted state for processor mode may be a single bit value stored in a register or memory location.

Complementing the predicted state, the branch prediction logic 208 also calculates and stores a corrected state associated with the predicted branch instruction. The corrected state contains information in case the prediction is incorrect. Information stored as part of the corrected state may contain a recovery address and the previous state of the processor. The corrected state may be used by the processor 100 to recover the proper instruction order sequence in case of a branch misprediction.

As a result of the prediction made by the branch prediction logic 208, information is provided to the fetch logic within the fetch stage 202 to direct subsequent instruction fetches. The predicted state is used by the fetch logic to retrieve the appropriate instructions based on the prediction. For example, if the predicted state contains a target address, the fetch logic retrieves the next instruction from the instruction cache 106 located at that target address. Should the instruction not be available in the instruction cache 106, the fetch logic loads the instruction from memory 114 into the instruction cache 104 and then loads the instruction into the upper pipe 250.

It is not uncommon to encounter another branch instruction requiring a prediction before the initial branch prediction has been resolved. In this instance, the processor 100 keeps track of each of the predictions that are performed by the branch prediction logic 208. This tracking includes identifying which prediction came first. One way of tracking the "age" of the prediction is to utilize an instruction order value associated with each conditional branch instruction. As each predicted state is assigned, the instruction order value is also assigned, stored or carried with the branch instruction. Once the prediction logic has performed the prediction or has determined that the current instruction in the instruction decode stage 206 requires no prediction, the instruction is passed on to the appropriate lower pipeline 210 and 220.

As described previously, the lower pipelines 210 and 220 may be associated with certain types of instructions. For example, a pipeline may be designed only to execute instructions of an arithmetic nature or handle all of the load/store functionality. In order to send a predicted branch instruction to a pipeline, the pipeline has to be designed to handle branch instructions. As shown in FIG. 2, both lower pipelines 210 and 220 are configured to handle branch instructions. The lower pipelines 210 and 220 may also be designed to execute multiple instructions during each processor cycle. Thus, within the lower pipelines 210 and 220, multiple branch instructions may be executed during the same processor cycle.

Once the instructions enter the appropriate lower pipeline 210 or 220, the instructions, such as branch instructions, may be rearranged to facilitate a more efficient execution. If a branch instruction reaches the lower pipeline 210 or 220, and needs further information or data to continue execution, the processor 100 may execute another instruction or group of instructions before executing the branch instruction. In this case, the branch instruction may be held in a reservation station (not shown) until the information necessary to facilitate execution is available. For example, the branch instruction may be held in the reservation station if the branch instruction branches to a target address stored in a particular register and the target address is not yet available. The value of the target address may be determined as a function of another subsequently executed instruction. The branch instruction is held until the subsequent instruction executes, updates the particular register and the target address becomes available. After the target address becomes available, the branch instruction is released for further execution. Instructions executed in this manner are executed in parallel based on available resources rather than original program sequence. After the instructions have executed in the lower pipelines 210 and 220, the results are collected and are reordered into the proper sequence so the processor 100 may be updated correctly.

Within the reservation station, several instructions may be held at the same time, each instruction waiting for further information, processor resources, and the like. Commonly, multiple instructions may be released from the reservation station during the same processor cycle by the processor 100. Thus, it is possible that multiple branch instructions may be released from the reservation station during the same processor cycle.

The processor 100 continues to monitor the instructions as they are executed in the lower pipelines 210 and 220. When a branch instruction has been released from the reservation station or is ready for final execution, the processing of the prediction associated with the branch instruction is performed by resolution logic 225 within a resolution stage 215 of each lower pipeline 210 and 220. The resolution stage 215 will be described in connection with the discussion of FIG. 3.

The resolution logic 225 verifies the correctness of the predicted state and selects the corrected state in the event of a misprediction. For example, if the predicted state is a target address and the target address does not match the actual target address determined, a mispredict occurs. In the case of a misprediction, the resolution logic 225 provides feedback to the fetch stage 202 including information identifying the instructions needing to be flushed as well as the corrected state. The flushed instructions are instructions previously fetched based on the incorrect prediction. After the appropriate instructions are flushed, the fetch logic starts re-fetching instructions based on the corrected state. If the resolution logic 225 determines that a prediction was correct it takes no action and the instructions speculatively fetched (based on the prediction) are subsequently executed.

Figure 3:
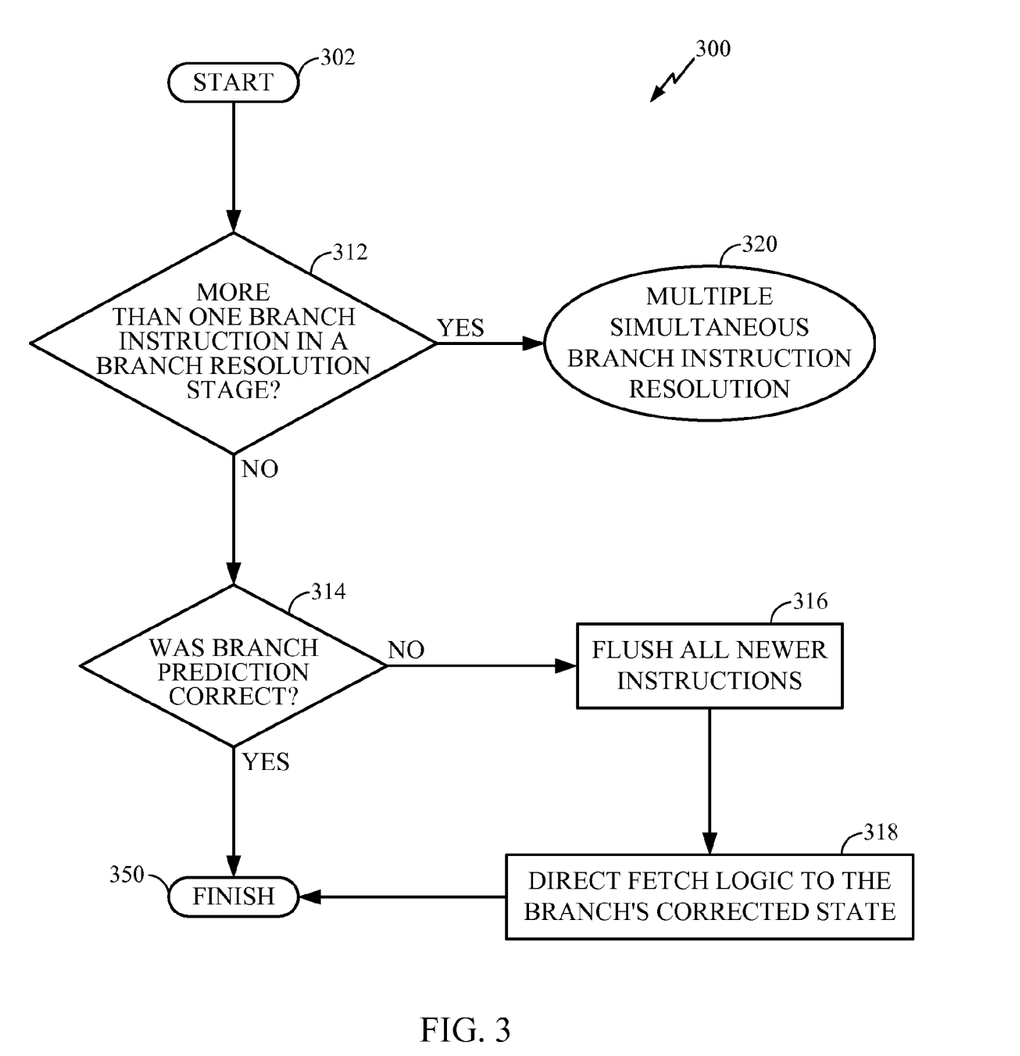
FIG. 3 shows a flow chart of a resolution stage in a pipeline of the processor of FIG. 1.

FIG. 3 shows a flow chart describing the process flow 300 associated with the resolution stage 215 in either lower pipeline 210 and 220. The process flow 300 begins at start block 302 when the predicted branches instructions have had all their dependencies resolved. A branch dependency is resolved when all the operands upon which the prediction is based are available. This resolution occurs in either of the lower pipelines 210 and 220 in the resolution stage 215.

At decision block 312, a decision is made whether there are multiple predicted branches entering the branch resolution stage 215 simultaneously. As discussed previously, multiple branch instructions may enter the resolution stage 215 during the same processor cycle in the same lower pipeline 210 or 220. One aspect of the present invention resolves multiple branch predictions simultaneously in the same lower pipeline 210 or 220. In an alternative embodiment, a branch prediction entering the resolution stage 215 in lower pipeline 210, and a branch prediction entering the resolution stage 215 of lower pipeline 220 may be resolved simultaneously. Should the processor 100 have additional lower pipelines, another embodiment of the present invention may resolve multiple branch predictions in one of the lower pipelines.

The processor 100 monitors both lower pipelines 210 and 220 to make this assessment. If the processor 100 determines that there are multiple branch predictions entering the resolution stage 215 simultaneously, the process flow 300 is directed to a multiple simultaneous branch resolution flow 320. The multiple simultaneous branch resolution flow 320 determines how to resolve two or more predicted branch instructions simultaneously entering the branch resolution stage 215 and is discussed further in connection with FIG. 4. If only one branch prediction is entering the resolution stage 215, the process flow 300 continues to decision block 314.

At decision block 314, the branch prediction results are analyzed to determine if the branch was correctly predicted. If the prediction for the conditional branch instruction was correctly predicted at decision block 314 (e.g. the predicted target address of a conditional branch instruction matches a resolved target address), the remaining instructions in the lower pipelines 210 and 220 as well as the upper pipe 250 have been correctly predicted, and the process flow 300 is then directed to finish block 350.

If, at decision block 314, the branch prediction results show that a mispredict has occurred (e.g. the predicted target address does not match the resolved target address), all instructions younger than the mispredicted instruction (based on the instruction order value of the branch prediction) are flushed from the upper pipe 250 and the lower pipelines 210 and 220 as indicated at block 316. The process flow 300 proceeds to block 318 where the branch's corrected state information is then fed to the fetch logic within the fetch stage 202. The fetch logic fetches instructions based on the branch's corrected state.

Figure 4:
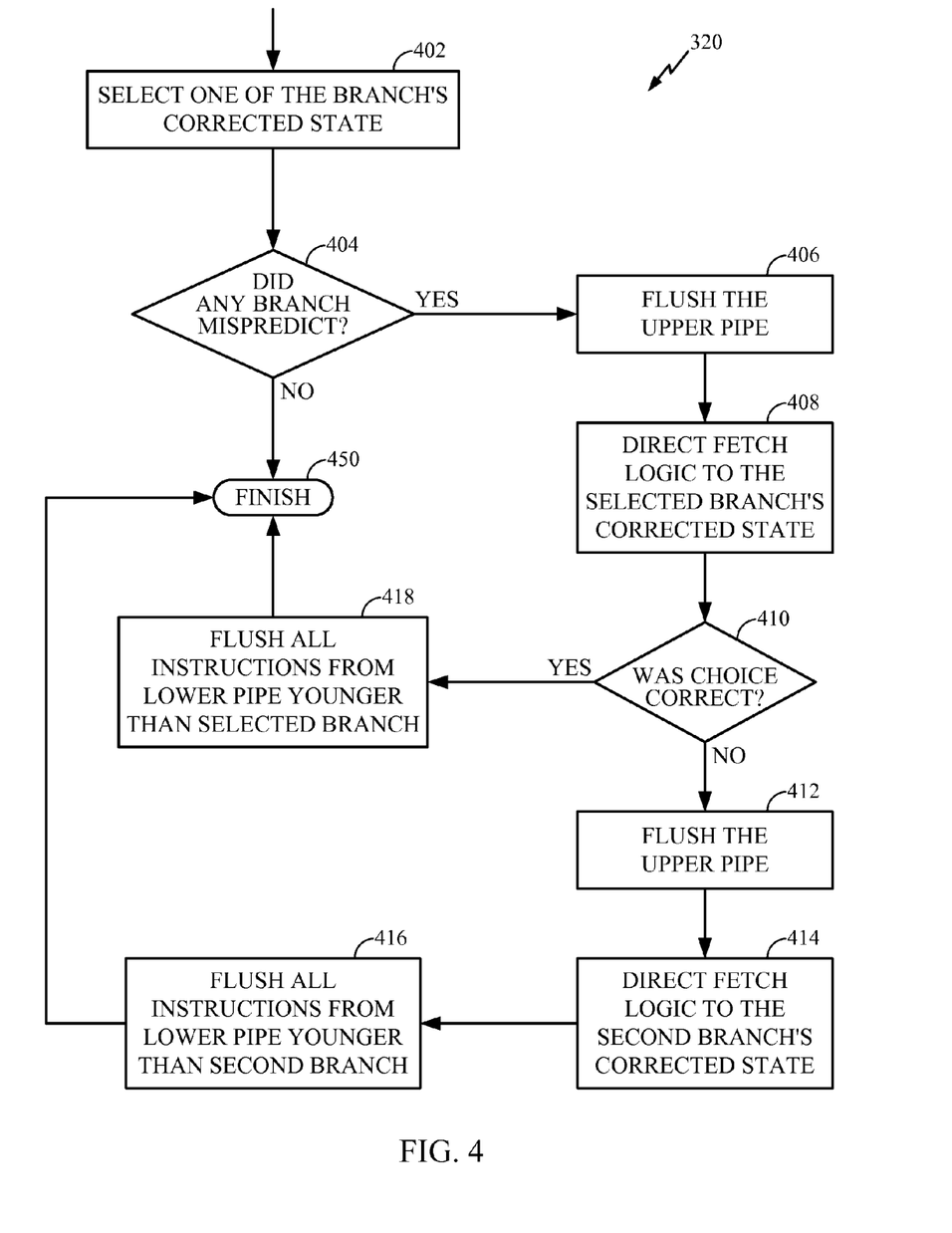
FIG. 4 shows a flow chart of a multiple simultaneous branch resolution flow of FIG. 3.

FIG. 4 illustrates a multiple simultaneous branch resolution process flow 320 in further detail. The multiple simultaneous branch resolution process flow 320 begins when two or more predicted branches reach the resolution stage 215 during the same processor cycle. When two or more predicted branches enter the resolution phase 215 simultaneously, the processor 100 handles the resolution of both branches during the same processor cycle. This resolution includes determining if either branch has mispredicted and taking the appropriate actions such as redirecting a pipeline.

As shown in FIG. 4, the multiple simultaneous branch resolution process flow 320 first chooses one of the resolving branch's corrected state at block 402. The selection of one of the corrected states occurs before the multiple simultaneous branch resolution process flow 320 determines if a mispredict has occurred. By selecting one of the corrected states early in the multiple simultaneous branch resolution process flow 320, additional time may be saved by anticipating a mispredict. If a mispredict has not occurred, no additional processing time has been lost by this selection.

The selection of the particular branch's corrected state can be based on several factors. In one embodiment, the selection of the corrected state is based on the relative ages of the resolving branches and the oldest branch instruction is selected. In an alternative embodiment, the selection of the corrected state may be based on which of the lower pipelines 210 or 220 mispredicted most recently. In yet another embodiment, the selection may be based on from which lower pipeline 210 or 220 the last prediction came. In a further embodiment, the type of instruction may be used as a basis for selecting the corrected state. Alternatively, the corrected state may be chosen at random. Regardless of the selection process, the selected corrected state will be used to steer the fetch logic for future instruction fetches in the case of a mispredict.

The selection of the corrected state may have an impact on the execution speed of the processor 100. Depending on the processor design, each of the aforementioned aspects may have certain speed advantages. For example, choosing a corrected state based on the lower pipeline 210 or 220 that last made a prediction may perform faster than determining which of the lower pipelines 210 or 220 last mispredicted. The validity of the corrected state is verified later in the multiple simultaneous branch resolution process flow 320.

One advantage of a processor 100 utilizing the embodiments described previously is that the processor 100 anticipates that the oldest branch prediction was mispredicted. Accordingly, the processor 100 takes the appropriate action such as flushing the upper pipe 250 and the lower pipelines 210 and 220, instead of reducing the processor frequency to accommodate the extra time needed to determine exactly which branch has mispredicted in a single cycle. If the processor 100 chooses the correct mispredicting branch a higher clock frequency may be achieved since the processor 100 will start flushing and refetching instructions before waiting to determine which branch prediction corresponds to the oldest mispredicting branch. The increased clock rate afforded to the processor 100 far outweighs any clock cycles lost due to choosing the wrong corrected state.

After the corrected state information has been selected at block 402 the multiple simultaneous branch resolution process flow 320 proceeds to decision block 404. At decision block 404, the resolution logic 225 determines if a mispredict for any branch instruction has occurred. If no misprediction has occurred at decision block 404, the multiple simultaneous branch resolution process flow 320 ends at block 450. In this case, both predictions were correct and the instructions loaded into the upper pipe 250 and lower pipelines 210 and 220 are valid and no correction is necessary.

If a mispredict has occurred, the multiple simultaneous branch resolution process flow 320 proceeds to block 406 where all of the instructions in the upper pipe 250 are flushed. Since all instructions in the upper pipe 250 are still in program order they are younger than either resolving branch. Because instructions in the upper pipe 250 are younger than either resolving branch instruction, they were fetched down the mispredicted path and are flushed.

After the upper pipe 250 has been flushed at block 406, the multiple simultaneous branch resolution process flow 320 continues to block 408. At block 408, the fetch logic uses the corrected state of the selected branch to redirect fetching in the upper pipe 250. The multiple simultaneous branch resolution process flow 320 continues to decision block 410. At decision block 410, the choice of corrected state information is verified by checking if the mispredicted branch instruction corresponds to the branch instruction whose corrected state had been selected. If the verification is successful at decision block 410, at block 418 the processor 100 flushes the more recent instructions from the lower pipelines 210 and 220 based on the instruction order value. From block 418, the multiple simultaneous branch resolution process flow 320 ends and proceeds to block 450.

If at block 410 the verification failed (i.e. the oldest mispredicting branch was not selected), all instructions are flushed again from the upper pipe 250 at block 412. The flushing of instructions at block 412 effectively removes the instructions fetched at block 408 from the upper pipe 250. The second branch's corrected state information is then fed to the fetch logic at block 414. The fetch logic fetches instructions based on the second branch's corrected state. All of the instructions younger than the second branch prediction (based on instruction order value) are flushed from the lower pipelines 210 and 220 at step 416. After the instructions are flushed from the lower pipelines 210 and 220 the multiple simultaneous branch resolution process flow 320 ends at step 450.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method comprising:
processing two or more predicted branch instructions, each predicted branch instruction having a predicted state and a corrected state, the two or more predicted branch instructions entering a resolution stage including lower pipelines, wherein a first of the predicted branch instructions is in a first of the lower pipelines and a second of the predicted branch instructions is in a second of the lower pipelines, wherein the first of the lower pipelines and the second of the lower pipelines each include an execution unit;
selecting a selected corrected state associated with the first of the predicted branch instructions;
determining that at least one of the two or more predicted branch instructions has mispredicted;
in response to determining that the at least one of the two or more predicted branch instructions has mispredicted:
performing a first flush of a common pipeline; and
initiating a first instruction fetch in the common pipeline based on the selected corrected state;
after initiating the first instruction fetch, determining whether the corrected state of an oldest predicted branch instruction that has mispredicted corresponds to the selected corrected state; and
when the corrected state of the oldest predicted branch instruction that has mispredicted does not correspond to the selected corrected state:
performing a second flush of the common pipeline to flush instructions obtained in response to the first instruction fetch; and initiating a second instruction fetch in the common pipeline based on the corrected state of the oldest predicted branch instruction that has mispredicted.

2. The method of claim 1, wherein the common pipeline is within an instruction fetch unit (IFU).

3. The method of claim 2, wherein the IFU is coupled to receive instructions from an instruction cache via a data bus.

4. The method of claim 1, further comprising, when the oldest predicted branch instruction that has mispredicted has the selected corrected state, performing a first flush of at least one of the lower pipelines.

5. The method of claim 4, further comprising, when the oldest predicted branch instruction that has mispredicted does not correspond to the selected corrected state,
performing a second flush of at least one of the lower pipelines.

6. A system comprising:
a processor that includes:
  a first lower pipeline and a second lower pipeline, each of the first and second lower pipelines including an execution unit;
  a common pipeline coupled to each of the first and second lower pipelines;
  resolution logic coupled to each of the first and second lower pipelines, the resolution logic configured to:
    process two or more predicted branch instructions, each predicted branch instruction having a predicted state and a corrected state, wherein a first of the predicted branch instructions is within the first lower pipeline while a second of the predicted branch instructions is within the second lower pipeline;
    select a selected corrected state associated with the first of the predicted branch instructions;
    determine that at least one of the two or more predicted branch instructions has mispredicted;
    in response to determining that the at least one of the two or more predicted branch instructions has mispredicted:
      perform a first flush of the common pipeline; and
      initiate a first instruction fetch in the common pipeline based on the selected corrected state;
    after initiating the first instruction fetch, determine whether the corrected state of an oldest predicted branch instruction that has mispredicted corresponds to the selected corrected state; and
    when the corrected state of the oldest predicted branch instruction that has mispredicted does not correspond to the selected corrected state:
      perform a second flush of the common pipeline to flush instructions obtained in response to the first instruction fetch; and
      initiate a second instruction fetch in the common pipeline based on the corrected state of the oldest predicted branch instruction that has mispredicted.

7. The system of claim 6, wherein the common pipeline is within an instruction fetch unit (IFU).

8. The system of claim 6, further comprising fetch logic coupled to the resolution logic.

9. The system of claim 6, wherein when the oldest predicted branch instruction that has mispredicted does not correspond to the selected corrected state:
the resolution logic is further configured to identify instructions to be flushed from at least one of the first lower pipeline and the second lower pipeline.

10. The method of claim 1, wherein the common pipeline comprises an upper pipeline.

11. The system of claim 6, wherein the common pipeline comprises an upper pipeline.

12. A method comprising:
processing a first predicted branch instruction and a second predicted branch instruction, the first predicted branch instruction and the second predicted branch instruction being processed in a resolution stage associated with at least one lower pipeline, wherein the first predicted branch instruction has a first predicted state and a first corrected state and the second predicted branch instruction has a second predicted state and a second corrected state;
selecting the first corrected state as a selected corrected state;
making a first determination that one of the first predicted branch instruction and the second predicted branch instruction mispredicted;
in response to the first determination:
  initiating a first flush of a common pipeline; and
  initiating a first instruction fetch based on the selected corrected state;
only after initiating the first instruction fetch, making a second determination that the selected corrected state does not correspond to a corrected state of an oldest mispredicted branch instruction of the first predicted branch instruction and the second predicted branch instruction; and
in response to the second determination:
  initiating a second flush of the common pipeline to flush instructions obtained in the first instruction fetch; and
  initiating a second instruction fetch based on the corrected state of the oldest mispredicted branch instruction.

13. The method of claim 12, further comprising:
flushing at least a portion of the at least one lower pipeline in response to the second determination.

14. The method of claim 12, wherein the common pipeline comprises an upper pipeline.

* * * * *